July 30, 1963     S. S. KREMEN ETAL     3,099,149
APPARATUS FOR TREATING ANIMAL HIDES
Filed Aug. 7, 1961     7 Sheets-Sheet 1

FIG. 1

INVENTORS
SEYMOUR S. KREMEN
ROBERT LEE SOUTHWOOD
BY
Benjamin Sweadler
ATTORNEY

INVENTORS
SEYMOUR S. KREMEN
ROBERT LEE SOUTHWOOD
BY
Benjamin Sweedler
ATTORNEY

July 30, 1963    S. S. KREMEN ETAL    3,099,149
APPARATUS FOR TREATING ANIMAL HIDES
Filed Aug. 7, 1961    7 Sheets-Sheet 5

INVENTORS
SEYMOUR S. KREMEN
ROBERT LEE SOUTHWOOD
BY
Benjamin Sweedler
ATTORNEY

FIG. 12

INVENTORS
SEYMOUR S. KREMEN
ROBERT LEE SOUTHWOOD
BY
Benjamin Sweedler
ATTORNEY

United States Patent Office 3,099,149
Patented July 30, 1963

3,099,149
APPARATUS FOR TREATING ANIMAL HIDES
Seymour S. Kremen and Robert Lee Southwood, Cincinnati, Ohio, assignors to Leather Research Corporation, New York, N.Y., a corporation of Delaware
Filed Aug. 7, 1961, Ser. No. 129,639
6 Claims. (Cl. 69—32)

This invention relates to apparatus useful in the treatment of animal hides or skins to produce leather.

Conventionally, the preparation of leather from animal hides commences with the preservation of the raw hides from freshly butchered animals, as by salting, at the packing house. The cured hides are shipped to the tannery where they are first soaked to remove blood, salt, etc., and are then defleshed. The hides are treated with lime to remove the hair and the dehaired hides are thereafter "bated" to physically and chemically condition the hides for tanning. The water-wet hides are then exposed to aqueous baths containing the desired tanning agent for the time necessary to convert the hides into leather.

The preparation of the hides for tanning by the procedures described above takes about a week; vegetable tanning of thick leathers takes about four to five weeks or longer. Thus, a period of five, six or more weeks is required to produce leather from animal hide by present commercial operations.

It has been suggested tthat the preparation of leather may be accelerated by dehydrating the bated or otherwise prepared hides, and then "solvent tanning" the hides in some organic fluid which relatively rapidly penetrates the hides. One particularly effective process for dehydrating water-wet animal hides (which may be either freshly flayed washed hide at the packing house or bated dehaired hides ready for tanning) is disclosed in our copending application Serial No. 859,656, filed December 15, 1959, which issued as Patent No. 3,048,929 on August 14, 1962. This process involves extracting water from the hides with a volatile organic solvent, which may be acetone or methanol, until the solvent-water ratio in the hides is at least 9 to 1, with the initial stages of the extraction being carried out at temperatures below about 100° F. and the final stage of the extraction being performed with the solvent maintained between 110° F. and its boiling point. The hides are then separated from the liquid extractant, and the solvent and water remaining in the hides are evaporated by exposing the hides to a circulating stream of gas heated to 110° F. to 210° F., the gas stream being recirculated about the hides until it contains a minimum 25 mol percent of solvent vapor, and the solvent being partially condensed and removed from the gas stream while maintaining the minimum percentage of solvent vapor therein, until about 75% or more of the solvent has been evaporated from the hides.

The use of the last mentioned dehydration procedure, followed by solvent tanning of the dehydrated hides, reduces the total time required for the production of leather from hides to a matter of about one week from the five or more weeks required by conventional operations, and reduces the duration of the tanning operation to a period of from about twenty four to forty eight hours in place of the four or more weeks presently utilized by tanners. In order, however, to practice these dehydration and solvent tanning procedures it is necessary to utilize large volumes of volatile solvents, and to form vapor mixtures containing such solvents which are noxious and which may present explosion hazards. Accordingly, a major problem in providing apparatus for carrying out such operations on an efficient commercial scale involves the design of equipment capable of processing large numbers of hides per day, which at the same time provides satisfactory protection for the workmen from the hazards involved in handling the volatile organic solvents.

It is among the objects of the present invention to provide such apparatus which is safe in operation, particularly in that it is designed to prevent escape of noxious gases into the atmosphere and prevent accumulation of gases which might give rise to explosion hazards, which is relatively compact, efficient in operation and is adapted to provide high thru-puts.

A further object of this invention is to provide such apparatus designed to minimize loss of solvent and to effect recovery of solvent in a reusable form, thus facilitating economical operation.

Further objects and advantages of the present invention will be apparent from consideration of the following detailed description taken in connection with the accompanying drawings disclosing, for purposes of illustration without limitation, a preferred embodiment of the invention wherein.

Figure 1:
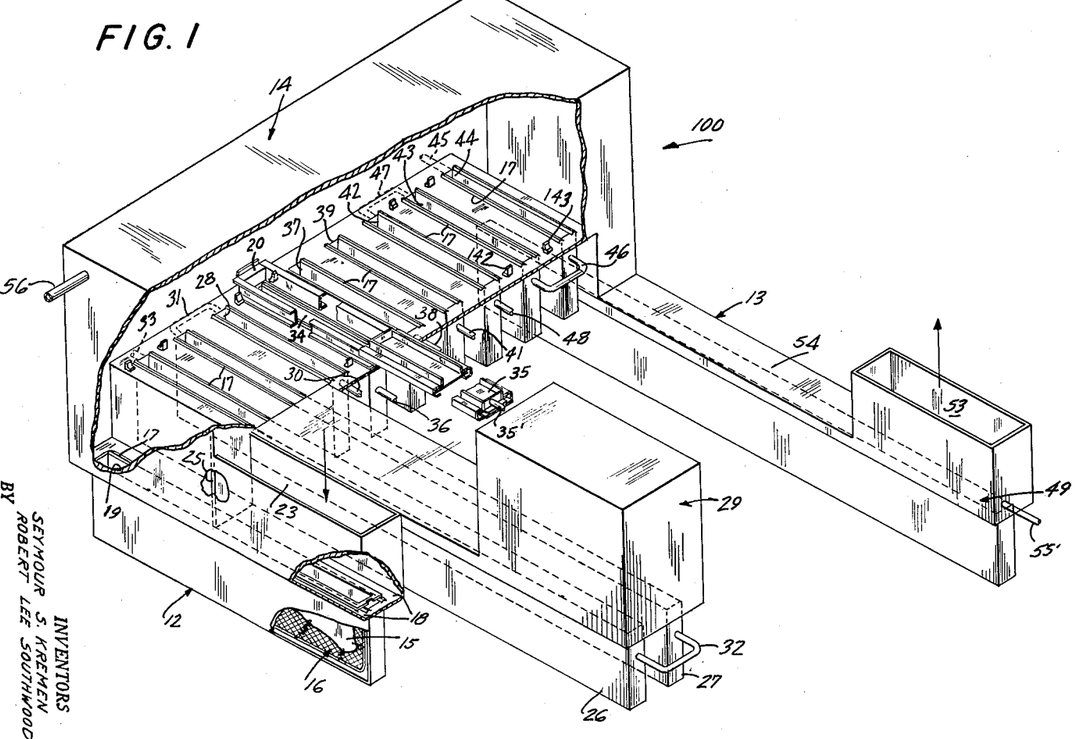
FIGURE 1 is a perspective view, partly schematic, of the leather treating apparatus of the invention, with the walls of the vapor hood partially cut away and the hoist, elevator, pusher and puller mechanisms removed for clarity of illustration.
Figure 2:
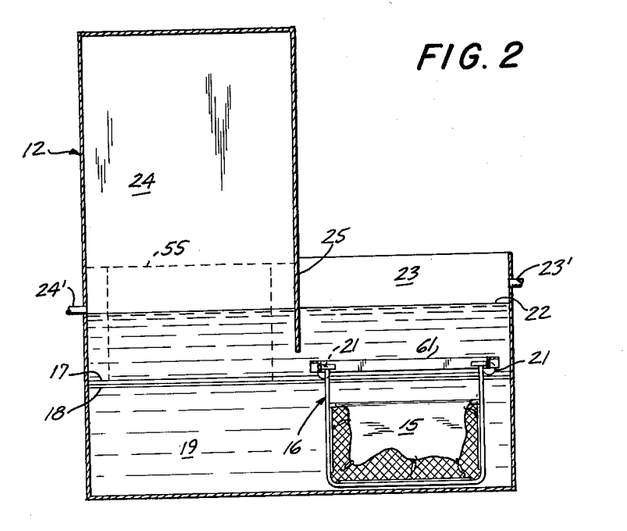
FIGURE 2 is a partly schematic vertical section through the inlet tank of the leather treating apparatus of FIGURE 1.
Figure 3:
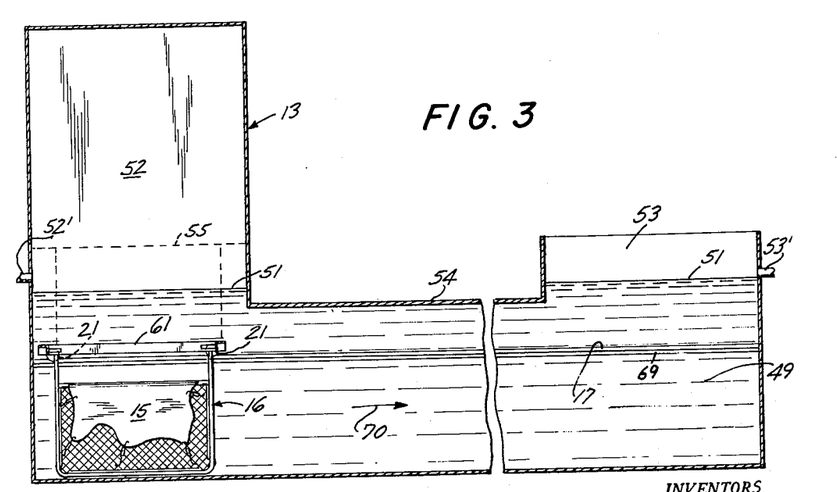
FIGURE 3 is a partly schematic vertical section through the outlet tank of the leather treating apparatus.

Referring first to FIGURES 1 to 3, the leather treating apparatus shown comprises an inlet tank 12, an outlet tank 13 and a series of treating tanks, described hereinafter. A vapor hood 14 encloses the discharge portion of the inlet tank 12, the series of treating tanks and the inlet portion of the outlet tank 13. Each group of hides 15 is mounted on a rack and frame assembly 16; a plurality of such assemblies are successively introduced into the inlet tank 12 through a liquid seal, hereinafter described, and are removed from the outlet tank 13 through a liquid seal at the discharge portion of the outlet tank. The assemblies are moved through the inlet tank, the various treating tanks and the outlet tank along pairs of tracks or rails 17 positioned lengthwise of each such tank, in the manner described hereinafter.

The inlet tank 12, shown in FIGURES 1 and 2, is a longitudinally elongated tank having flanges 18 separating the lower section 19 from the section thereabove, which is wider than the lower section 19. The rails 17 are positioned on the flanges 18 for supporting the rollers 21 of successive rack and frame assemblies 16 for movement lengthwise of the tank. The inlet tank 12 contains a body of water having a water level 22 shown in FIGURE 2, such that the group of hides on each such rack and frame assembly is completely immersed in the body of water. The tank includes an inlet portion 23 communicating with the atmosphere, in which portion each rack and frame assembly is immersed in the water by an external hoist, and a discharge portion 24 at the opposite end thereof. An intermediate baffle 25 separates the inlet from the discharge portions, which baffle extends below the level 22 of the body of water in order to provide a liquid seal between the atmosphere at the inlet portion 23, and the discharge portion 24 of the inlet tank. To maintain the level 22 constant, the inlet portion 23 is provided with a water inlet 23' and the discharge portion is provided with a water level controlling outlet 24'.

An elevator for lifting each rack and frame assembly 16 within the discharge portion is indicated generally by the dotted lines 55 in FIGURE 2; the structure and operation of the elevator will be explained more fully hereinafter.

The discharge portion of the inlet tank 12 is located adjacent and parallel to a series of longitudinally elongated dehydration tanks (see FIGURE 1) including a first dehydration tank 26, a second dehydration tank 27 and a third dehydration tank 28, arranged in side by side relation. The dehydration tanks, which communicate with the vapor hood 14, are of any suitable length for accommodating one or more of the rack and frame assemblies 16 therein. Tanks 26 and 27 have one pair of adjacent ends positioned within a transfer hood 29 communicating with the vapor hood 14, in which transfer hood a hoist is mounted for effecting the transfer of successive assemblies from one tank to the other.

The dehydration tanks contain bodies of a volatile water-miscible organic extracting solvent, such as acetone or methanol, for extracting water from the groups of hides moved successively through the tanks. The extracting solvent is fed through a line 30 to the body of liquid in the dehydration tank 28, then flows through a line 31 to the body of liquid in the dehydration tank 27, and through a line 32 to the body of liquid in the dehydration tank 26; the spent extracting medium is removed from the dehydration tank 26 through a line 33. The solution removed through the line 33 is passed to a still for separation of the extracting solvent from the water extracted from the hides. Preferably, the solvent is added continuously, thus providing a continual flow of extracting solvent through the dehydration tanks 28, 27 and 26, in sequence. The liquid bodies within the dehydration tanks are heated by heating coils associated with the tanks, to facilitate the rapid extraction of water from the groups of hides passed therethrough.

A longitudinally elongated desolventizing tank 34 is positioned adjacent the last dehydration tank 28. Mounted over the desolventizing tank is a sealing lid 35 therefor, which is movable from the position shown in FIGURE 1, in which position the tank 34 is in communication with the vapor hood 14, to a position sealing the tank 34 relative to the vapor hood 14. The sealing lid 35 is desirably moved by a piston rod 35', actuated by a suitable hydraulic or pneumatic pressure cylinder, lengthwise of the flanged upper walls 20 of the desolventizing tank 34. A vapor feed line 36, and a vapor exhaust line, lead into and out of the desolventizing tank 34, respectively, for exposing the groups of hides to a circulating gas stream, and heating coils are located in the desolventizing tank, to thereby speed evaporation of the extracting solvent and water from the hides mounted on the rack and frame assemblies 16.

Positioned next to the desolventizing tank 34 is an impregnation tank 37 communicating with the vapor hood 14 and containing a body of a volatile organic impregnating solvent having therein an impregnant for the hides. A feed line 38 and a removal line are provided for circulating the impregnating solution for the groups of hides through the impregnation tank 37. The impregnating solution fed through the tank comprises a solution of a non-tanning impregnant in an organic solvent, such as those compositions disclosed in our copending application Serial No. 729,238, filed April 18, 1958, which issued as Patent 2,983,566 on May 9, 1961, or a solution of a tanning impregnant, such as formaldehyde, in an organic solvent, as disclosed in our copending application Serial No. 729,254, filed April 18, 1958, which issued as Patent 2,983,567 on May 9, 1961. Preferably, the impregnating solvent utilized is the same organic solvent used to extract the water from the groups of hides passed through the dehydration tanks 26, 27 and 28.

In the preferred embodiment, a rinse tank 39 is disposed adjacent to the impregnation tank 37, communicating with the vapor hood 14 and containing a body of an organic solvent solution for the impregnant, which reduces the concentration of impregnant in the outer layers of the hide substance to produce hides having desirable physical finishing characteristics. A feed line 41 and a removal line lead into and out of the rinse tank for circulating the organic solvent solution through the tank; preferably, the solvent employed is acetone or methanol.

A series of fixing tanks 42, 43 and 44, which communicate with the vapor hood 14, are disposed in side by side relation adjacent to the rinse tank 39, each of the fixing tanks containing a body of an aqueous liquid therein for fixing the impregnant within the groups of hides moved therethrough. The aqueous fixing liquid, preferably acidified water, is fed through a line 45 to the body of aqueous liquid in the fixing tank 44, then flows through a line 46 to the body of liquid in the fixing tank 43, and through a line 47 to the body of liquid in the fixing tank 42; the spent fixing medium is removed from the fixing tank 32 through a line 48. Thus the fixing tank 44 contains a body of substantially pure water with little solvent content, and the fixing tank 42 contains a body of liquid comprising water in admixture with a relatively high concentration of the solvent extracted from the groups of hides passed through the fixing tanks. The aqueous liquid removed from the fixing tank 42 is distilled to separate and recover the fraction of organic solvent contained therein from the spent aqueous fixing liquid.

The outlet tank 13, best shown in FIGURES 1 and 3, is a longitudinally elongated tank having a pair of the rails 17 positioned above a lower section 49 of the tank, for supporting the rollers 21 of each rack and frame assembly 16 for movement through the tank. The outlet tank contains a body of water having a water level 51, shown in FIGURE 3, such that the group of hides 15 on each rack and frame assembly is completely immersed in the water. The tank includes a first or inlet portion 52 positioned adjacent and parallel to the fixing tank 44, and a discharge portion 53 at the opposite end of the tank communicating with the atmosphere, from which discharge portion the rack and frame assemblies are removed by an external hoist. The water level 51 is located above the level of an elongated wall section 54 separating the inlet and discharge portions 52 and 53 in order to provide a liquid seal between the inlet portion and the atmosphere. To maintain a constant water level, a water inlet 53' and a water level controlling outlet 52' lead into and out of the tank, respectively, to provide water flow through the outlet tank 13 countercurrent to the direction of movement of the rack and frame assemblies therethrough. Desirably, the outlet 52' is connected in series with the line 45 through which water is fed to the fixing tank 44, thereby extending the countercurrent fixing operation, described more completely hereinafter, to the outlet tank 13.

An elevator, indicated generally at 55 and described below in connection with FIGURE 4, lowers each rack and frame assembly 16 through the inlet portion 52 of the outlet tank 13.

As shown in FIGURE 1, the lower sections 19 and 49 of the inlet and outlet tanks 12 and 13, respectively, are positioned parallel to and are vertically displaced below the treating tanks disposed within the vapor hood 14, viz. the dehydration tanks 26, 27 and 28, the desolventizing tank 34, the impregnation tank 37, the rinse tank 39, and the fixing tanks 42, 43 and 44. The levels 22 and 51 of the bodies of water contained in the inlet and outlet tanks are so positioned relative to the baffle 25 and the wall section 54 of the inlet and outlet tanks, respectively, that vapor contained within the vapor hood 14 cannot escape to the atmosphere, i.e., the bodies of water in the inlet portion 23 and the discharge portion 53 seal these tanks against the escape of vapor. Thus the solvent vapors produced above the open treating tanks are retained within the vapor hood 14 and do not create explosion hazards or produce noxious odors in the vicinity of the treating apparatus. A vapor inlet line 56 and a vapor outlet line are provided in the vapor hood 14 for circulation of an inert gas, such as $N_2$ and/or $CO_2$, through the hood 14 to maintain a safe inert atmosphere therein.

One of the rack and frame assemblies 16 which move through the treating apparatus is shown in greater detail in FIGURE 4; this figure shows this assembly positioned in the inlet portion 52 of the outlet tank 13, into which position the assembly has been moved by the elevator 55, hereinafter described.

Figure 4:
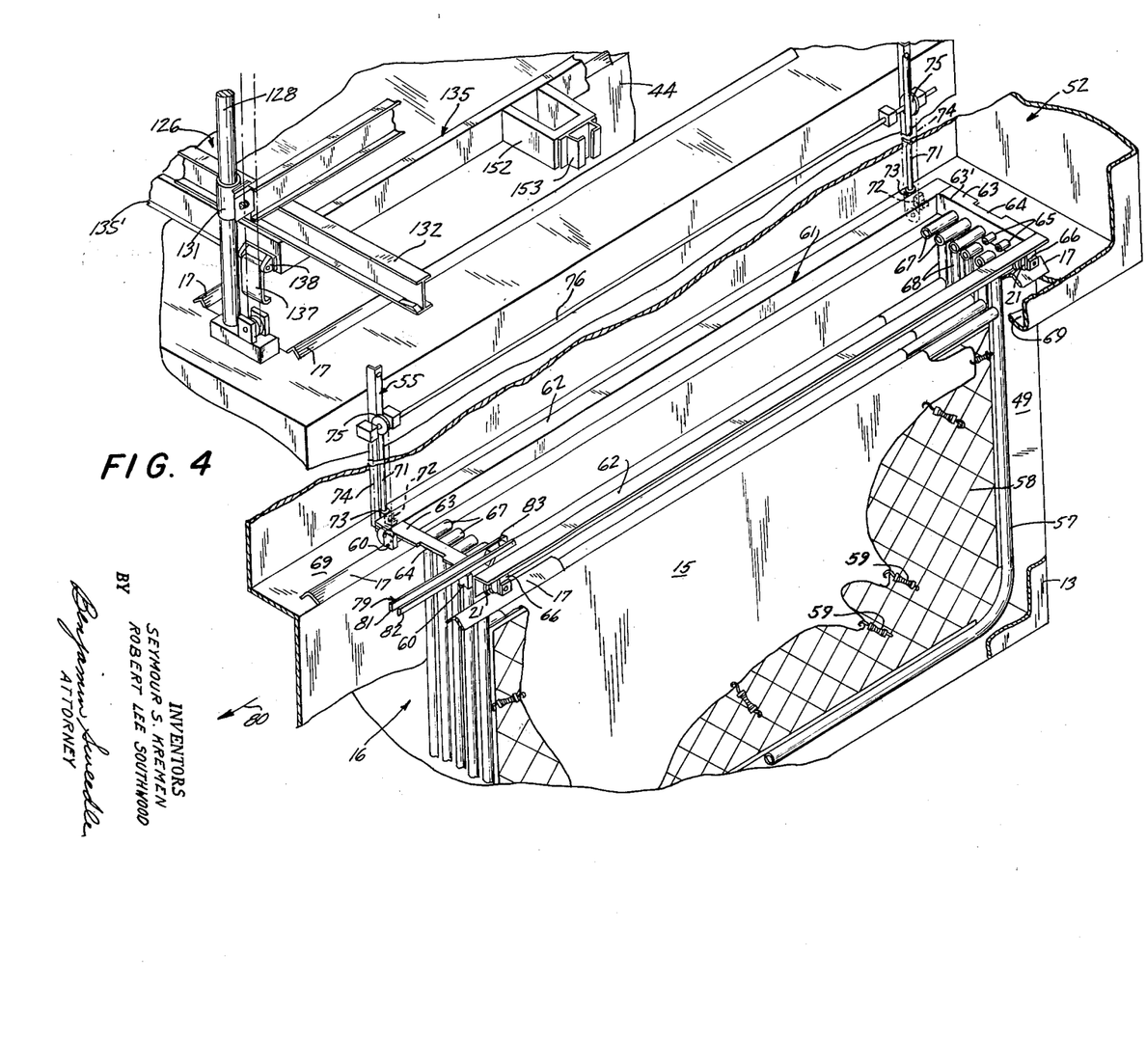
FIGURE 4 is a fragmentary perspective view, enlarged relative to FIGURES 1 to 3, of a group of hides mounted on a rack and frame assembly within the outlet tank of the leather treating apparatus, showing portions of hoist, elevator and puller mechanisms for moving the rack and frame assembly into and through the outlet tank.

As shown in FIGURE 4, the animals hides 15 to be treated, e.g. cow hides with the grain sides out, are mounted on rectangular tubular frames 57, made of metals such as stainless steel or aluminum which are resistant to the dehydrating, impregnating, rinsing and fixing solutions employed in the treating apparatus. An expanded wire mesh 58 of the same or similar metal is stretched between the sides of each frame 57 and the hide 15 is mounted over the top of the frame and attached to the mesh by means of extensible fasteners 59. Obviously, with smaller hides or larger frames, a plurality of hides can be mounted on opposite sides of the same frame.

Five of the frames 57 are supported in assembled relation in the rack and frame assembly 16 by a rack 61. The rack 61 comprises a pair of L-shaped side members 62 whose upper horizontal surfaces extend outwardly of the frame, fastened together by a pair of L-shaped end members 63, also having outwardly extending upper horizontal surfaces. Each of the end members 63 is provided with an elongated rectangular notch 64 on its upper horizontal surface, and with five spaced frame supports 65 secured to its vertical surface; each of the side members 62 has a pair of the rollers 21 supported for rotation in bearings 66 thereon, which bearings are mounted on the vertical surfaces of the side members adjacent their ends. Mounted at opposite ends of the rack 61, adjacent the abutting edges of the side members 62 and the end members 63 are pairs of contact blocks 60, two of which are shown in FIGURE 4, adapted to engage the contact blocks of adjacent rack and frame assemblies 16 within the outlet tank 13.

The frames 57 of the rack and frame assembly 16 are supported from the rack 61 by means of sleeves 67 mounted on arm extensions 68 at opposite ends of each of the frames, which sleeves are adapted to seat upon the frame supports 65 secured to the opposite end members 63 of the rack 61.

A pair of flanges 69 extend along the length of the outlet tank 13, above the lower section 49 thereof within which the frames 57 are adapted to be seated. The rails 17 are mounted on the flanges 69 for supporting the rollers 21 of the rack 61, and the frame assemblage carried thereby, upon lowering the rack and frame assembly into the outlet tank by means of the elevator 55.

The elevator 55 provided for lowering the rack and frame assembly 16 into the outlet tank 13 is shown in fragment in FIGURE 4. The elevator, which is rectangular in horizontal cross section, has fixed standards 71 at its four corners, two of which are shown in FIGURE 4, which standards are mounted symmetrically above the lower section 49 of the inlet portion 52 of the tank. At each of the four corners of the elevator a supporting finger 72 is secured to a collar 73 which is slidable on the standard 71. The supporting fingers 72 are adapted to support each corner of the rack 61 under the outwardly extending horizontal surfaces of the side members 62 thereof. Chains 74 are fastened to the collars 73 for effecting vertical movement of the collars and the supporting fingers 72 secured thereto. The chains 74 are driven by sprockets 75 on a motor driven drive shaft 76.

The elevator 55 shown in FIGURE 4 is employed, as will appear hereinafter, to lower successive rack and frame assemblies 16 into the lower section 49 of the outlet tank 13, and an identical elevator 55 is employed to raise the successive rack and frame assemblies 16 out of the lower section 19 of the discharge portion of the inlet tank 12.

Figures 5, 10:
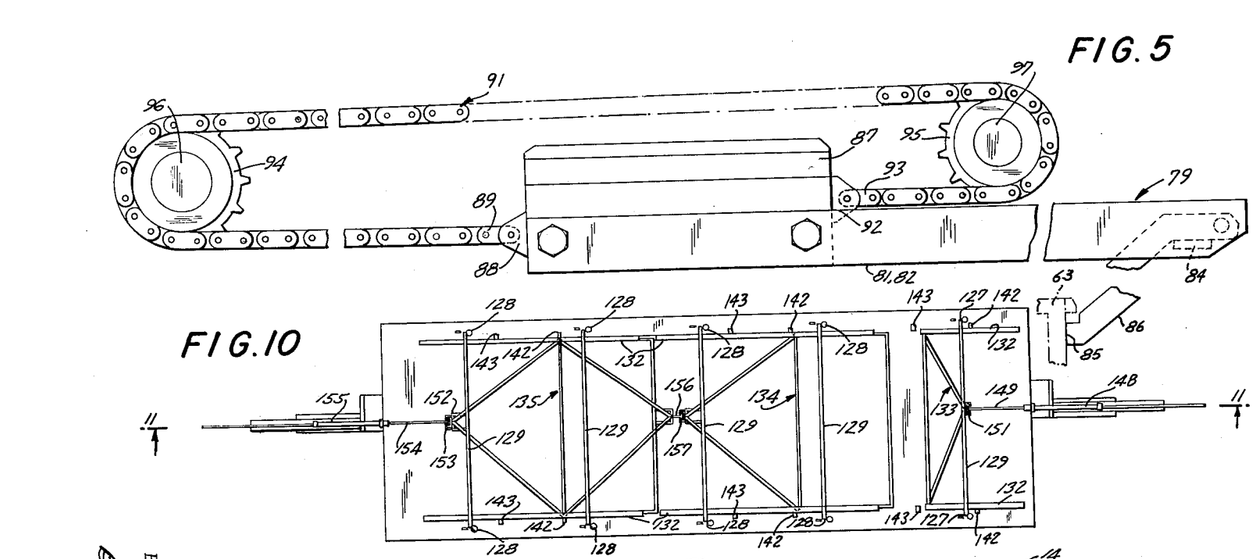
FIGURE 5 is a side elevation of a puller bar utilized to effect movement of the rack and frame assemblies through the outlet and dehydration tanks.
FIGURE 10 is a horizontal section through the vapor hood of the leather treating apparatus showing three internal hoists for moving rack and frame assemblies from tank to tank within the vapor hood, and with the tanks and elevators removed for clarity.

A puller bar 79 effects movement of the rack and frame assembly along the rails 17 in the direction indicated by arrow 80 in FIGURE 4. The puller bar 79 (see FIGURES 4 and 5) comprises two spaced apart side members 81 and 82, between which is pivotably secured a depending finger 83, adjacent one end of the juxtaposed side members. The depending finger is mounted adjacent a stop block 84 which serves to limit the pivotal movement of the finger. As shown in FIGURE 5, the depending portion of the finger 83 has a leading contact face 85 adapted to engage the inside vertical surface of one of the end members 63 of the rack 61, to effect movement of the rack and frame assembly through the outlet tank in the direction of arrow 80, and a trailing contact face 86 which, upon movement of the puller bar 79 in the opposite direction, contacts the edge 63' of the other end member 63 (shown in FIGURE 4) to effect pivotal movement of the finger 83 above the rack 61.

Secured to the side members 81 and 82, at the end of the puller bar opposite that at which the depending finger 83 is supported, is a connector plate 87 having a lower mount 88 at one end secured to one end 89 of an endless chain 91 and an upper mount 92 at the opposite end secured to the other end 93 of the endless chain. The chain 91 is, in turn, mounted on and driven by a puller drive sprocket 94 and an idler sprocket 95. Suitable guide members may be mounted on the sprockets and connector plate, as desired, to guide the movement of the puller bar 79 relative to the sprockets.

Figure 6:
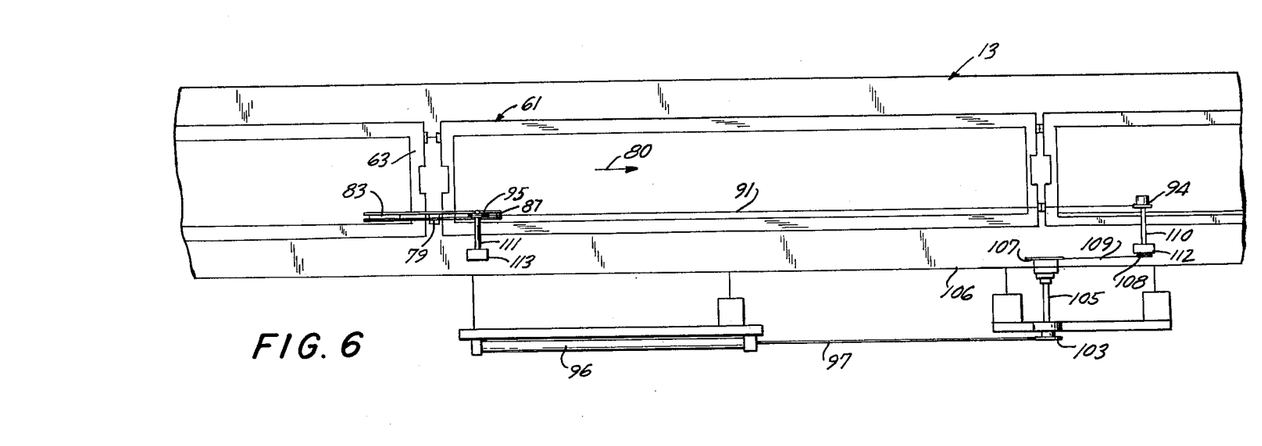
FIGURE 6 is a partly schematic horizontal section through a portion of the outlet tank, showing the puller bar and the drive mechanism for actuation thereof.
Figure 7:
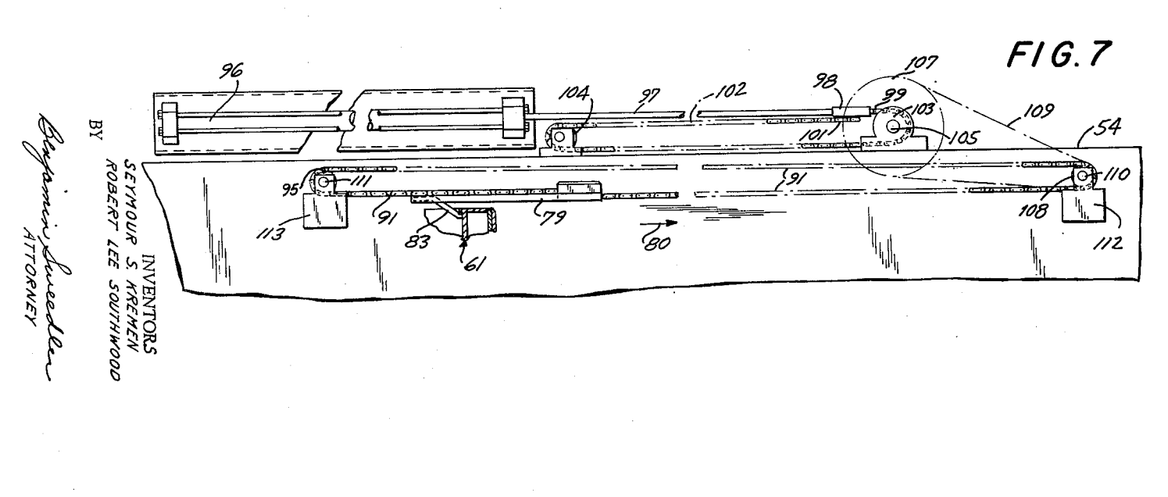
FIGURE 7 is a side elevation, partially in section, of the drive mechanism for the puller bar, shown in FIGURE 6.

The drive effecting the movement of the chain 91 and the puller bar 79 carried thereby is best shown in FIGURES 6 and 7, in which a fluid pressure operated cylinder 96 of either the hydraulic or pneumatic type having a reciprocating piston rod 97 for actuating the puller drive, is shown mounted alongside the outlet tank 13. The piston rod 97 terminates in a connector 98 which is secured to the opposite ends 99 and 101 of a chain 102 engaging the teeth of a pair of spaced sprockets 103 and 104; the resulting chain drive effects rotation of the sprocket 103 in either a clockwise or counter-clockwise direction, depending upon the stroke of the piston rod 97. The sprocket 103 is fixed on a drive shaft 105 extending through a wall 106 of the outlet tank into the vapor hood through a vapor proof seal. The rotary motion of the shaft 105 is transmitted through auxiliary drive sprockets 107 and 108 of a chain drive 109 to a drive shaft 110 upon which the puller drive sprocket 94 is fixed. The drive shaft 110 and a drive shaft 111, upon which the idler sprocket 95 is mounted, are journalled in supports 112 and 113, respectively, spaced lengthwise of the outlet tank 13 beneath the wall section 54 separating the inlet and discharge portions of the outlet tank. It will be noted that the sprockets 94 and 95 are so positioned that the puller bar 79 and the chain drive 91 do not interfere with the deposit or withdrawal of the rack and frame assemblies 16 into or out of the inlet portion 52 and discharge portion 53, respectively, of the outlet tank, i.e., solely the puller bar 79 is positionable within the inlet portion 52 and is withdrawn therefrom when it is desired to lower a rack and frame assembly on elevator 55 into the inlet portion, and the puller mechanism is not positionable within the discharge portion 53, from which the assemblies are lifted by an external hoist.

Puller bars 79 and the drive mechanisms therefor, substantially as shown in FIGURES 4 to 7 and described above, are also provided for pulling the rack and frame assemblies 16 along the rails 17 associated with each of the dehydration tanks 26 and 27.

Figure 8:
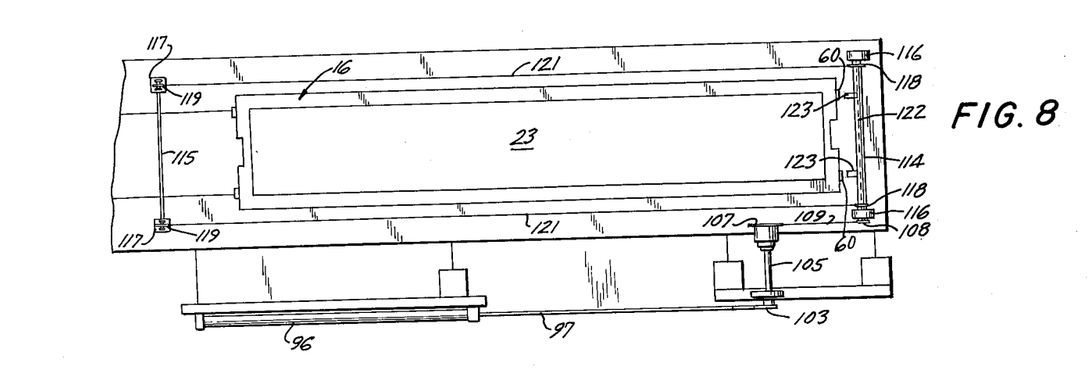
FIGURE 8 is a partly schematic horizontal section through a portion of the inlet tank, showing a pusher bar and the drive mechanism for actuation thereof for moving rack and frame assemblies through the inlet tank.
Figure 9:
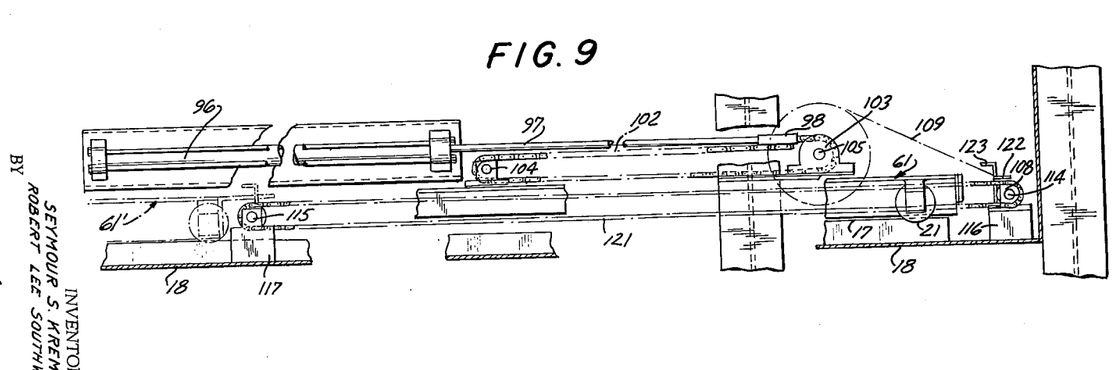
FIGURE 9 is a side elevation, partially in section, of the drive mechanism for the pusher bar, shown in FIGURE 8.

In the preferred embodiment of the invention, the inlet tank 12 is shorter than the outlet tank 13 and can only accommodate two rack and frame assemblies at the same time. In order to move each such assembly from the inlet portion 23 to the discharge portion 24 of the inlet tank without interfering with the deposit or withdrawal of rack and frame assemblies into or out of the inlet tank, the pusher mechanism shown in FIGURES 8 and 9 is employed in place of the puller mechanism described above in connection with FIGURES 4 to 7. Those parts of the pusher drive shown in FIGURES 8 and 9 which are the same as parts of the puller drive shown in FIGURES 6 and 7 are identified by the same reference characters.

As shown in FIGURES 8 and 9, a drive shaft 114 and an idler shaft 115 are journalled in supports 116 and 117, respectively, mounted on the flange 18 at opposite ends of the inlet portion 23 of the inlet tank. A pair of drive sprockets 118 and a pair of idler sprockets 119 are fixed on the opposite ends of the shafts 114 and 115, respectively and the aligned sprockets of each pair are engaged by a pair of endless chains 121. Secured to each of the chains 121 is a horizontal bar 122 which extends transversely of the inlet tank, and has a pair of spaced L-shaped pusher members 123 secured intermediate its ends for engaging the contact blocks 60 of each rack and frame assembly to push the assembly through the inlet tank.

Movement of the bar 122 and pusher members 123 is effected by rotating the drive shaft 114 from the chain drive 109 which is driven in turn by the fluid pressure actuated drive described above in connection with FIGURES 6 and 7. The bar 122 and pusher members 123 are thus positioned in either of the inlet or discharge portions of the inlet tank, depending on the stroke of piston rod 97, thus permitting deposit or withdrawal of rack and frame assemblies from the unoccupied portion of the tank.

If it is desired to employ a larger inlet tank having an intermediate portion through which a puller bar may be movable without interfering with the inlet or discharge of rack and frame assemblies to or from the tank, the puller mechanism described above in connection with FIGURES 4 to 7 may, alternatively, be substituted for the pusher mechanism shown in FIGURES 8 and 9.

Figure 11:
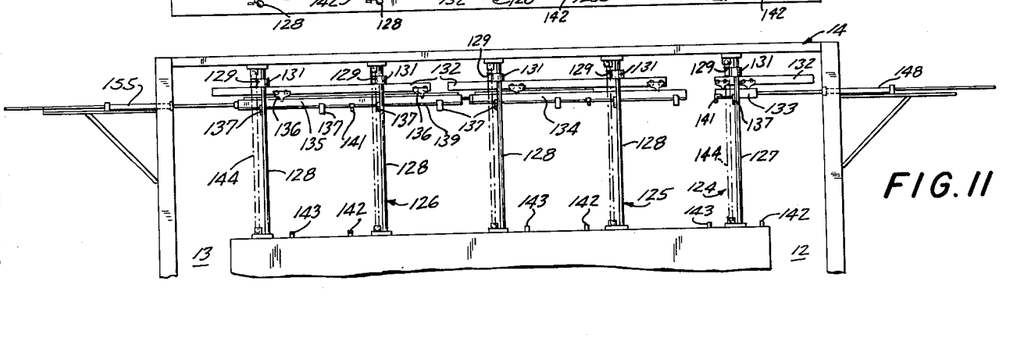
FIGURE 11 is a vertical section taken along the line 11—11' of FIGURE 10.
Figure 12:
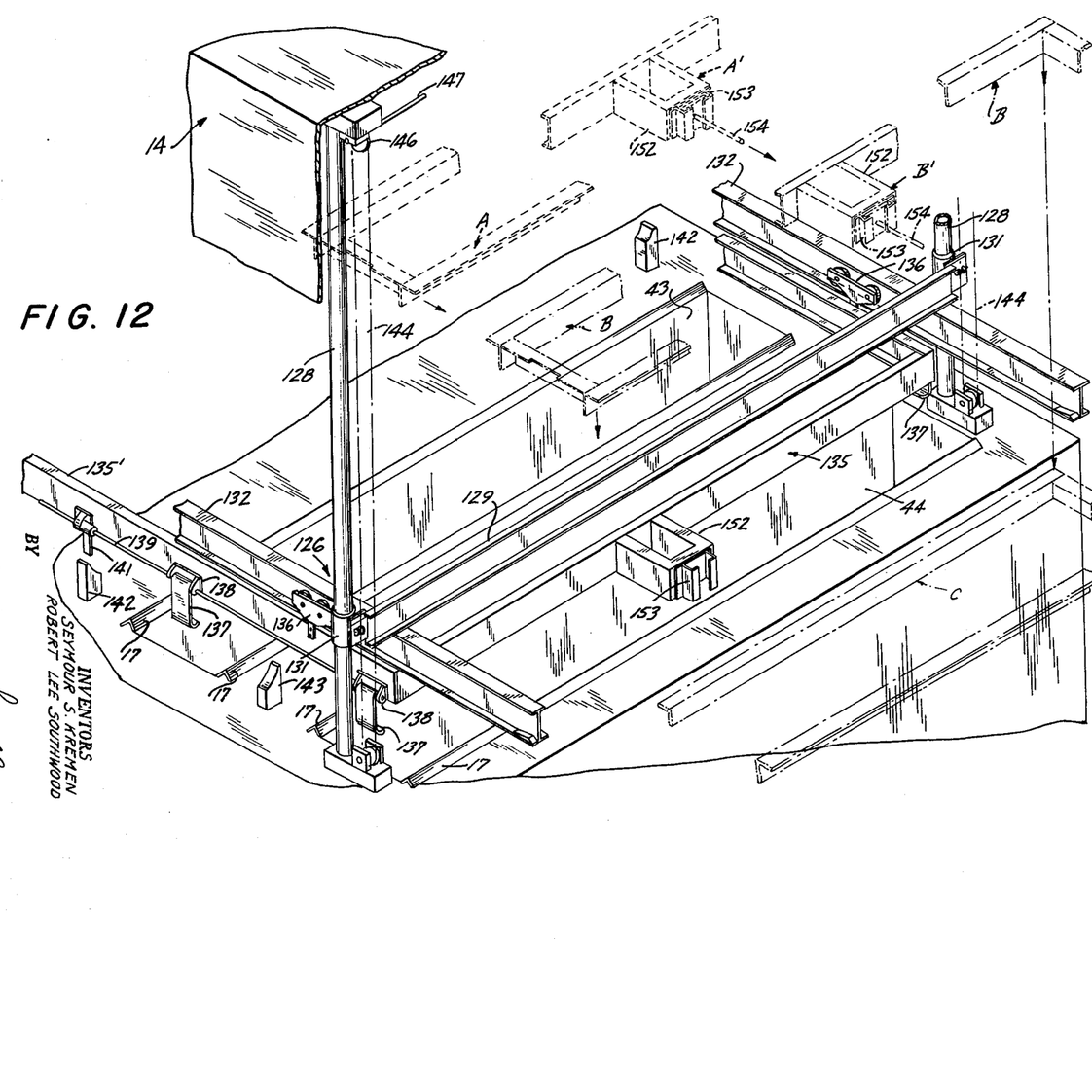
FIGURE 12 is a fragmentary perspective view of one of the internal hoists within the vapor hood, showing the relative sequential positions of a rack transferred by the hoist from the last fixing tank to the outlet tank.

Referring to FIGURES 10, 11 and 12, three hoists 124, 125 and 126 are disposed along the length of the vapor hook 14 for transferring the rack and frame assemblies 16 successively from the inlet tank 12, to several of the treating tanks spaced equal distances apart from one another within the vapor hood, and finally to the outlet tank 13. Hoist 124 has a pair of fixed supporting standards 127 disposed on opposite sides of the vapor hood 14, and hoist 125 and 126 each includes two pair of similar supporting standards 128 disposed in spaced relation on opposite sides of the vapor hood. Cross-beams 129 are slidably mounted on each pair of the standards 127 and 128, as by being secured to collars 131 riding on the standards, as shown in FIGURE 12. The cross-beams 129 carry guide rails 132 which extend along the length of the vapor hood on either side thereof to support and guide the hereinafter described hoist carriages for movement.

Hoist carriages 133, 134 and 135 are supported for movement lengthwise of the hoists 124, 125 and 126, respectively, the carriages depending from trolleys 136 which are adapted to ride along the flanges of the guide rails 132. Mounted in pairs on opposite sides of each hoist carriage are latches 137; four such pairs of latches are spaced along the length of each of the hoist carriages 134 and 135 and one such pair of latches is mounted on opposite sides of hoist carriage 133. The latches and associated mechanism on opposite sides of each carriage are constructed and arranged in the same manner; hence only the latch mechanism on one side of the hoist carriage 135, shown in FIGURE 12, will be described in detail.

The latches 137 are each pivotally supported in a bracket 138 on side member 135' of the hoist carriage and are mounted on a common rock shaft 139 extending lengthwise of the side member 135'. The rock shaft 139 is pivoted by the action of an actuating finger 141 adapted to engage either of a latching cam block 142 or a release cam block 143, which blocks are mounted adjacent the mouths of the treating tanks in spaced relation along the length of the vapor hood 14.

The location and number of latches 137 and latching and release cam blocks 142 and 143 at the sides of each of the hoist carriages 133, 134 and 135 is dependent on the location and number of rack and frame assemblies to be lifted, displaced, and lowered into adjacent tanks at the same time. In the preferred embodiment shown in FIGURES 10 to 12, inclusive, a single pair of the latches 137 are mounted on opposite sides of the hoist carriage 133, for engaging one of the frames 61 adjacent the notches 64 at either end thereof, and four pairs of the latches 137 are mounted on each of the hoist carriages 134 and 135, with each pair of latches spaced apart a distance equal to that between the adjacent treating tanks, for simultaneously engaging four of the frames 61. One pair of the latching cam blocks 142 and one pair of the release cam blocks 143 is disposed beneath each of the hoist carriages on opposite sides of the vapor hood 14.

The hoist carriage 133, which is supported at the end of the vapor hood adjacent the inlet tank 12 and has the aforesaid single pair of latches 137 pivotally mounted thereon, is thus adapted to transfer one rack and frame assembly from the discharge portion 24 of the inlet tank to the inlet portion of the dehydration tank 26. The four spaced pairs of latches mounted on hoist carriage 134 facilitate the simultaneous transfer of four rack and frame assemblies from dehydration tanks 27 and 28, desolventizing tank 34 and impregnation tank 37 to dehydration tank 28, desolventizing tank 34, impregnation tank 37 and rinse tank 39, respectively, by the aforesaid hoist cariage. Similarly, the latch arrangement on hoist carriage 135, which carriage is positioned adjacent the outlet tank 13, facilitates the simultaneous transfer thereby of four rack and frame assemblies from rinse tank 39 and fixing tanks 42, 43 and 44 to fixing tanks 42, 43 and 44 and inlet portion 52 of the outlet tank 13, respectively, in the manner described hereinafter.

The hoist carriages 133, 134 and 135 are independently raised or lowered by chain drives 144 which are fastened to the collars 131 and actuated by sprockets 146 driven from drive shafts 147, such as is shown in FIGURE 12 for elevating the hoist carriage 135. As the collars 131 are raised or lowered, the cross-beams 129 and the rails 132, together with the hoist carriages carried thereby are, at the same time, moved vertically of the supporting standards 127, 128.

Horizontal movement of the hoist carriage 133 along the guide rails 132 is actuated by a pressure operated horizontal travel cylinder 148 having a T-shaped piston rod 149 adapted to engage a flanged connector 151 secured to the hoist carriage. Upon movement of the hoist carriage 133 in the vertical plane, the flanged connector 151 slides into or out of engagement with the piston rod 149, thus facilitating independent vertical or horizontal motion of the carriage.

A bracket 152 is secured to the hoist carriage 135 at the left end thereof, viewing FIGURES 10 and 11, supporting a flanged connector 153 adapted to engage a T-shaped piston rod 154 of a second horizontal travel cylinder 155, by which horizontal movement of hoist carriage 135 along the guide rails 132 is produced. At the right end of the hoist carriage 135 a T-shaped coupling element 156 is secured for engaging a flanged element 157 fixed to the left end of the hoist carriage 134. Thus, when as shown in FIGURES 10 and 11, hoist carriages 134 and 135 are elevated into the horizontal plane of the travel cylinder 155 with the piston rod 154 engaging the connector 153 on hoist carriage 135 and the carriages interlocked by means of the coupling elements 156 and 157, horizontal movement of both carriages is effected by actuation of the single travel cylinder 155. Either hoist carriage 134 or 135 may, of course, be independently moved in the vertical plane, the coupling elements 156 and 157 and the piston rod 154 and connector 153 sliding readily out of engagement.

It will be noted that each rack and frame assembly 16 is transferred from the dehydration tank 27 to the outlet tank 13, i.e., is displaced over each of the intermediate seven treating tanks, by means of the hoists 125 and 126, the hoist carriages of which move horizontally only the distance between adjacent treating tanks. By releasably interconnecting these hoist carriages in order that motion of both may be effected by a single pressure operated cylinder, and providing four pairs of the latches 137 on each carriage so that four rack and frame assemblies may be transferred at the same time thereby, the use of relatively large and expensive pressure operated cylinders having long piston strokes is avoided.

A further hoist, of the same construction as hoist 124, is provided in the transfer hood 29 for transferring successive rack and frame assemblies from the discharge end of dehydration tank 26 to the dehydration tank 27.

The sequential operations performed on each successive group of hides moved through the leather treating apparatus will be readily apparent in the light of the following explanation. Hides 15 are first attached to the mesh 58 on each of the five frames 57, by means of the fasteners 59. The frames are then assembled with a rack 61 by seating the pair of sleeves 67 of each frame over the corresponding frame support members 65 on opposite ends of the rack.

Each rack and frame assembly thus provided is successively lowered by an external hoist into the body of water in the inlet portion 23 of the inlet tank 12. The cylinder 96 of the pusher drive is then actuated, driving the piston rod 97 from the position shown in FIGURES 8 and 9 toward the left, thus effecting counter-clockwise rotation of the chain drives 102 and 121, and moving the bar 122 across the inlet portion of the tank. The L-shaped pusher members 123 secured to the bar 122 engage the contact blocks 60 of the rack 61, pushing the rack through the inlet tank to the discharge portion 24 thereof as shown at 61' in FIGURE 9. It will be understood the rack moves on the rollers 21 along the rails 17 at the sides of the tank. The frames depending from the rack 61 are thus completely immersed in the body of water as they pass beneath the carrier 25 and through the liquid seal in the inlet tank.

After the rack and frame assembly has been retained in the inlet tank for a predetermined period, the assembly is raised by means of elevator 55 in the discharge portion 24 thereof, the supporting fingers 72 lifting the rack 61 upon actuation of the chains 74 by the drive shaft 76.

The horizontal travel cylinder 148 is then actuated to move the hoist carriage 133 from the position shown in FIGURES 10 and 11 into a position in which the pair of latches 137 is vertically aligned with the notches 64 at the ends of the rack 61 in the discharge portion of the inlet tank. The hoist carriage 133 is then lowered by actuating the drive shaft 147 associated with the hoist 124, thus rotating the chain drives 144 and lowering the carriage. As the hoist carriage is lowered, the flanged connector 151 disengages from the T-shaped piston rod 149. When the hoist carriage reaches a position immediately above the rack 61, the actuating fingers 141 mounted at opposite sides of the hoist carriage contact the camming surfaces of the pair of latching cam blocks 142 and are pivoted thereby, thus turning the rock shafts 139 and engaging the pair of latches 137 in the notches 64 at the ends of the rack 61. The direction of rotation of the drive shaft 147 is then reversed and the hoist carriage 133 is elevated, simultaneously raising the rack and frame assembly out of the discharge portion of the inlet tank.

When the hoist carriage 133 reaches its elevated position, it engages the T-shaped piston rod 149 of the horizontal travel cylinder 148. The travel cylinder is then actuated, moving the piston rod and the hoist carriage to the left, viewing FIGURES 10 and 11, and displacing the rack and frame assembly longitudinally of the vapor hood 14 into a position from which it may be deposited within the first dehydration tank 26.

The hoist carriage 133 is then lowered in the manner described above, lowering the rack and frame assembly into the extracting solvent in the first dehydration tank 26. As the rollers 21 of the rack 61 contact the rails 17 above the tank, the pair of latches 137 engaging the rack are pivoted outward by the action of the pair of actuating fingers 141 camming against the pair of release cam blocks 143 below the hoist carriage, releasing the rack for movement along the length of the dehydration tank.

The rack and frame assembly is moved through the dehydration tank by a puller drive of the type shown in FIGURES 6 and 7. The puller bar 79 is moved into the position shown in FIGURES 6 and 7 by sliding the trailing contact face 86 of the depending finger 83 thereof over the end member 63 of the rack 61, the depending finger pivoting downward through the plane of the rack 61 after passing the end member 63. After retaining the rack and frame assembly in the first section of the dehydration tank 26 for a predetermined period, the cylinder 96 is actuated, driving the piston rod 97 to the left from the position shown in FIGURES 6 and 7, thus effecting counter-clockwise rotation of the chain drives 102 and 91. As the chain drive 91 is rotated, the puller bar 79 moves to the right, viewing FIGURES 6 and 7, and pulls the rack 16 and the depending frame assembly through the dehydration tank. If desired, the rack and frame assembly may be retained in different sections of the dehydration tank for any predetermined period of time prior to being advanced to the next succeeding section of the tank. The puller drive mechanism does not extend to the discharge end of the dehydration tank 26; hence the rack and frame assembly is pushed to the discharge end by a rack and frame assembly subsequently engaged by the puller bar 79.

The rack and frame assembly is thereafter transferred to the dehydration tank 27 by the hoist disposed within the transfer hood 29 and is pulled through the dehydration tank 27 by a further puller drive in the manner described above. The assembly is thereafter elevated, displaced laterally and lowered into each of the succeeding treating tanks, viz, the dehydration tank 28, the desolventizing tank 34, the impregnation tank 37, the rinse tank 39, and the fixing tanks 42, 43 and 44 in sequence, by the hoists 125 and 126, in the manner described above in connection with the operation of hoist 124. As noted, four rack and frame assemblies are simultaneously transferred to adjacent treating tanks by each of the hoists 125 and 126. Horizontal movement of the hoist carriages 133 and 134 of these hoists is effected by actuation of the single horizontal travel cylinder 155 which is engaged by both of the carriages when they are elevated to their upper adjacent positions.

Each rack and frame assembly is, of course, retained in each tank for a predetermined period of time to facilitate the desired processing of the hides mounted thereon.

The rack and frame assembly thus transferred to the last fixing tank 44 is finally elevated by the hoist 126, so that the rack 61 thereof is positioned as shown in dotted line at A, in FIGURE 12. This figure shows the relative sequential positions of the rack 61 of the rack and frame assembly viewed in the direction opposite the direction of movement of the assembly from one tank to the next within the apparatus, i.e., FIGURE 12 is a view looking in the direction of the arrow 100 in FIGURE 1. The rack, and the depending frame assembly, is sequentially moved, in the manner described above in connection with the withdrawal of the rack from the discharge portion of the inlet tank 12, from position A, to position B shown in phantom line, to position C shown in dot-dash line, in FIGURE 12. The relative positions of the flanged connector 153 and the T-shaped piston rod 154 of the horizontal travel cylinder 155, corresponding to positions A and B of the rack 61, are shown at A' and B' in FIGURE 12.

The rack and frame assembly is lowered by the hoist 126 and the elevator 55 from position C shown in FIGURE 12 above the outlet tank 13 to the position shown in FIGURE 4 within the inlet portion 52 of the outlet tank and, after a predetermined period of time, is pulled through the outlet tank by the puller bar 79, in the manner described hereinabove. Since the puller drive mechanism does not extend into the discharge portion 53 of the outlet tank, the rack and frame assembly is pushed into such portion by a rack and frame assembly subsequently pulled through the outlet tank by the puller bar 79. The assembly is elevated from the discharge portion of the outlet tank and returned to the atmosphere by an external hoist.

As noted, in order to effect substantially complete treatment of individual hides each rack and frame assembly is retained in each processing tank for a predetermined period prior to being advanced to the next tank. Preferably, heavy unsplit hides are retained in each of the dehydration tanks 26 and 27 for from about 4 to 12 hours, desirably about 8 hours, in dehydration tank 28 for from about 1 to 3 hours, desirably about 2 hours, in each of the desolventizing tanks 34, the impregnation tank 37 and the fixing tanks 42, 43 and 44 for from about 1 to 3 hours, desirably about 2 hours, and in the outlet tank 13 for from about 4 to 12 hours, desirably about 8 hours. The hides may be immersed in the inlet tank 12 for any desired period prior to being transferred to the treating tanks. Each assembly is, however, only immersed in the body of solvent in the rinse tank 39 for from about 5 to 20 minutes, preferably about 10 minutes, so that the impregnants will not be completely removed from the hides, but rather only removed from the surface layers thereof. In this fashion the hides are impregnated with a tanning and/or a non-tanning impregnant, the impregnant is fixed within the hides and the hides are ready for further processing after a period of from only about 1 to 2 days.

As each rack and frame assembly is thus moved through the treating apparatus, the extracting solvent is passed through the bodies of organic solvent contained in the dehydration tanks 28, 27 and 26, in sequence, counter-current to the direction of movement of the rack and frame assemblies through the tanks. The concentration of extracting solvent to which the hides in each assembly are exposed thereby increases from dehydration tank 26, to 27, to 28, as the assembly is moved sequentially through these tanks. When employing acetone as the extracting solvent and utilizing the hide residence times indicated above, the solvent flow rate is so adjusted as to maintain an acetone concentration of from about 70% to 85% in tank 26, from about 80% to 95% in tank 27 and in excess of 95% in tank 28, while at the same time the body of solvent in tank 26 is heated to a temperature of between about 65° F. and 100° F., preferably about 90° F., the solvent in tank 27 to between about 80° F. and 110° F., preferably about 100° F., and the solvent in tank 28 to from about 110° F. to as close to the boiling point of the acetone as possible, preferably about 120° F. By employing these conditions in combination, the predominant portion of the water is extracted from the hides without the formation of spots on the leather surfaces, which have heretofore resulted from attempts to extract water from hides at relatively high temperatures.

After each successive rack and frame assembly is lowered into the desolventizing tank 34, the lid 35 is moved from the position shown in FIGURE 1 into the position sealing the tank from the vapor hood 14, and the tank is heated to a temperature of from about 110° F. to 210° F. The vapors formed in the tank are then circulated therethrough to effect rapid removal of the solvent and water from the hides, the vapors being recirculated about the hides until the vapor stream contains at least 25 mol percent of solvent vapor, the vapors being withdrawn and the solvent being condensed and removed therefrom while maintaining at least 25 mol percent solvent in the vapor until 75 mol percent or more of the extracting solvent has been removed. Additional inert vapor, such as nitrogen and/or carbon dioxide, may be added to the vapors circulated through the desolventizing tank 34 to minimize the combustibility thereof and maintain the desired pressure conditions in the desolventizing system.

The organic impregnating and rinse solvents are, preferably, continuously circulated through the impregnation tank 37 and the rinse tank 39, respectively. The bodies of liquid in tanks 37 and 39 are desirably heated to a temperature of between about 100° F. and the boiling point of the impregnating solvent to accelerate the impregnating and rinsing of the groups of hides mounted on the rack and frame assemblies 16 passed successively through these tanks.

The aqueous fixing liquid is preferably first passed through the body of water in the outlet tank and then, in sequence, through the fixing tanks 44, 43 and 42. The hides in each rack and frame assembly are thus exposed to fixing liquids containing increasing proportions of water as they are moved successively through these tanks, counter-current to the liquid flow. The temperature of the fixing liquid in fixing tank 42 is maintained at between about 65° F. and 100° F., preferably about 70° F., in fixing tank 43 at between 90° F. and 105° F., preferably about 100° F. and in fixing tank 44 and outlet tank 13 at between about 90° F. and 115° F., preferably about 100° F. These temperatures prevent bleeding the impregnant from the hides in the relatively low water content liquid in tank 42, and achieve maximum solvent extraction along with fixation in the high water content liquid in tank 13. In this fashion, the fixing liquid in the first fixing tank 42 acts primarily to react or otherwise set the impregnant within the hide substance, whereas the fixing liquid in the outlet tank 13 acts primarily to extract the impregnating and rinse solvents from the hide substance.

Maintenance of the above temperature conditions in the bodies of aqueous fixing liquid insures optimum fixation hides treated with an impregnating solution containin an aldehyde tan, e.g. formaldehyde. When an impregnating solution containing a vegetable tan, e.g. quebracho, is utilized the bodies of fixing liquid in tanks 42, 43 and 44 are desirably maintained at slightly higher temperatures.

In steady state operations, at the beginning of each processing cycle rack and frame assemblies are disposed in each of the sections of each of the treating tanks with the sole exception of the rinse tank. As noted above, assemblies are immersed in the liquid in the rinse tank for only a predetermined portion of each cycle in order to effect removal of the impregnant from only adjacent the surfaces, and not from the interior, of the hides treated. The rack and frame assemblies are then passed through each tank as described above according to a desired program, illustrated in the following example, in which the process is performed in an apparatus similar to that shown in FIGURES 1 to 12, to convert dehaired hides to finished leather.

The inlet tank 12 and the outlet tank 13 were initially charged with bodies of water, and the water levels 22 and 51 are maintained fixed therein. The dehydration tanks 26, 27 and 28 were initially charged with acetone, the impregnation tank 37 with an impregnating solution such as any of the impregnating solutions containing impregnants, with or without tanning agents, disclosed for example, in our United States Patent 2,983,566, granted May 9, 1961, the rinse tank 39 with acetone or other rinse solutions and the fixing tanks 42, 43 and 44 with water. Fresh liquid was continuously circulated through each of the above tanks, with the acetone fed into the bodies of extracting solvent in the dehydration tanks passing, in sequence, through the dehydration tanks 28, 27 and 26, and the water fed into the bodies of fixing liquid in the outlet and fixing tanks passing, in sequence, through the outlet tank 13 and then through fixing tanks 44, 43 and 42.

An inert gas mixture consisting of 90 mol percent nitrogen and 10 mol percent carbon dioxide displaced the atmosphere in the vapor hood 14 and the transfer hood 29; the resulting inert atmosphere was maintained under a pressure of between 6 and 18 inches of water.

Rack and frame assemblies 16 were passed in sequence through each of the tanks according to the procedure outlined hereinafter, the residence time of each such assembly within each tank and the temperature of the treating fluid in each such tank being maintained at the values given in the following table:

| Tank | Temperature, °F. | Residence Time |
| --- | --- | --- |
| 12 | 70 | 4 hours. |
| 26 | 90 | 8 hours. |
| 27 | 100 | 8 hours. |
| 28 | 120 | 2 hours. |
| 34 | 150 | 2 hours. |
| 37 | 110 | 2 hours. |
| 39 | 110 | 10 minutes. |
| 42 | 70 | 2 hours. |
| 43 | 100 | 2 hours. |
| 44 | 100 | 2 hours. |
| 13 | 100 | 8 hours. |

At the beginning of each processing cycle after steady state operations were commenced, four rack and frame assemblies were present in each of tanks 26, 27 and 13, two such assemblies in tank 12 and one such assembly in each of tanks 28, 34, 37, 42, 43 and 44; no rack and frame assembly was present in the rinse tank 39. The following steps were then employed in sequence:

(1) A rack and frame assembly 16 was removed by an external hoist from the discharge portion 53 of the outlet tank 13.

(2) The lid 35 of the desolventizing tank 34 was retracted to the position shown in FIGURE 1.

(3) One rack and frame assembly was elevated from each of the discharge ends of the dehydration tank 27, from the dehydration tank 28, the desolventizing tank 34, and the impregnation tank 37 and the resultant group of four side by side assemblies were displaced laterally and lowered by the hoist 125 in the vapor hood 14 into tanks 28, 34, 37 and 39, respectively.

(4) The lid 35 of the desolventizing tank 34 was closed and the desolventizing tank was heated to a temperature of 150° F.; the gases thus evaporated from the group of hides mounted on the rack and frame assembly within the tank were recirculated through the tank. When the recirculated stream contained 25 mol percent acetone, about 10% of the stream was continuously passed to a condenser, the acetone condensed therein being recovered.

(5) The rack and frame assemblies in the outlet tank 13 were moved through the water bath in the tank, the first of the assemblies entering the discharge portion 53.

(6) The rack and frame assemblies in the dehydration tank 27 were moved through the body of extracting solvent in the tank, the first of the assemblies reaching the discharge end of the tank.

(7) The rack and frame assembly in the discharge end of the dehydration tank 26 was elevated from the tank by the hoist within the transfer hood 29, was displaced laterally, and was lowered into the dehydration tank 27.

(8) The rack and frame assemblies in the dehydration tank 26 were moved through the body of extracting solvent in the tank, the first of the assemblies reaching the discharge end of the tank.

(9) The rack and frame assembly in the discharge portion 24 of the inlet tank 12 was elevated by an elevator 55, displaced laterally and lowered into the dehydration tank 26 by the hoist 124 in the vapor hood 14.

(10) The rack and frame assembly in the inlet portion 23 of the inlet tank 12 was pushed through the body of water in the tank into the outlet portion 24 thereof.

The rack and frame assemblies were retained in the tanks to which they were advanced in steps 1 to 10 above for a period of ten minutes. After 10 minutes, the proper differential concentration of impregnant was produced within the hides in the rinse tank 39 and the following steps were performed:

(11) One rack and frame assembly was elevated from each of the rinse tanks 39 and the fixing tanks 42, 43 and 44, displaced laterally, and lowered into fixing tanks 42, 43, and 44, and onto the supporting fingers 72 of the elevator 55 positioned above the inlet portion of the outlet tank 13, respectively, by the hoist 126 within the vapor hood 14.

(12) A rack and frame assembly was lowered by means of an external hoist into the inlet portion 23 of the inlet tank 12, and the rack and frame assembly on the elevator 55 in the inlet portion of the outlet tank 13 was lowered into the tank.

The rack and frame assemblies were retained in the tanks to which they were advanced in steps 1 to 12, inclusive, (except for the rinse tank), for an immersion period of about one hour and fifty minutes after the completion of the rinse in the rinse tank. Thereafter the steps were repeated in the manner described above.

The vapor hood 14 was maintained throughout saturated with a mixture of $N_2$, $CO_2$ and acetone vapor at a temperature of 90° F., introduced through vapor line 56. The total loss of acetone from the apparatus approximated 1 to 2 pounds per hide passed therethrough, and the leather removed from the discharge portion 53 of the outlet tank 13 had the desirable properties obtained by formaldehyde tanning, without a brittle cracky grain.

For the two hour cycle illustrated (for each of the tanks, 28, 34, 37, 42, 43 and 44, which corresponds to an eight hour cycle in each of the tanks 26, 27 and 13, and a four hour cycle in tank 12), the processing period for rack and frame assemblies contained within tanks 28, 34 and 37, to the left of the rinse tank 39 viewing FIGURE 1, is initiated with step 3 above, encompasses the ten minute rinse period, the hour and fifty minute immersion period, and ends when the assemblies are transferred to the next adjacent tanks when step 3 is repeated. The processing period for rack and frame assemblies in tanks 42, 43 and 44, to the right of the rinse tank 39 viewing FIGURE 1, is initiated about ten minutes later than the initiation of the immersion of the rack and frame assemblies in tanks 28, 34 and 37 and is terminated about ten minutes later. Hence the processing periods for rack and frame assemblies immersed in tanks 28, 34, 37 and 42, 43, 44 are of the same duration, e.g., about two hours, but are out of phase by a time differential approximately equal to the rinse period, e.g., about ten minutes.

It will be noted that the above-described movements of the elevators for lifting rack and frame assemblies out of tank 12 and lowering assemblies into tank 13, of the pusher and puller mechanisms for moving the rack and frame assemblies through tanks 12, 26, 27 and 13, of the internal hoists effecting transfer of each rack and frame assembly from one tank to an adjoining tank, and of the lid for the desolventizing tank 34 are effected by mechanisms operated by pressure fluid, e.g., by a pressure fluid motor such as a pressure cylinder actuated penumatically, by oil pressure or other suitable pressure fluid. The flow of pressure fluid to each motor to effect such operation can be controlled in timed sequence by electrically operated valves, such as the well known solenoid type valves, to effect the desired timed operation, the operation of which valves is effected by conventional timing mechanism. Thus, once a rack and frame assembly is lowered by an external hoist into the inlet portion of tank 12, the processing of the hides is automatic and the assembly is delivered to the discharge portion of tank 13 from which it is removed by an extenral hoist. The same external hoist can be used for lowering the rack and frame assembly into the inlet tank 12 and removing the processed hides from the outlet tank 13, being mounted for this purpose on an overhead rail or other suitable mounting to facilitate movement of the hoist to and from above the inlet tank and above the outlet tank.

The present invention thus provides an apparatus useful in the production of leather from animal hides or skins, which is efficient in operation, provides high thruputs, and avoids the introduction of health or safety hazards by the escape of the volatile organic solvents utilized therein to the atmosphere.

It is to be understood that various changes may be made in the embodiment described within the scope of the present invention, and accordingly the scope thereof will be measured solely by the claims appended hereto.

What is claimed is:

1. Apparatus for the treatment of animal hides and skins comprising, in combination, a longitudinally elongated inlet tank containing a body of water therein of a depth such that successive groups of hides, with the hides in each group in side by side relation, can be completely immersed in said body and moved therethrough, said tank comprising an inlet portion communicating with the atmosphere, through which inlet portion the successive groups of hides are introduced into said body of water, a discharge portion and a baffle separating said inlet and discharge portions extending into the upper portion of the body of water to provide a liquid seal between the atmosphere and said discharge portion; a series of longitudinally elongated dehydration tanks arranged in side by side relation and disposed substantially parallel to the discharge portion of the inlet tank, each of said dehydration tanks containing a body of a volatile organic extracting solvent; means for flowing the solvent continuously through said dehydration tanks; a longitudinally elongated impregnation tank disposed substantially parallel to said dehydration tanks, said impregnation tank containing a body of a volatile organic impregnating solvent having therein an impregnant for the hides; a series of longitudinally elongated fixing tanks arranged in side by side relation and disposed substantially parallel to said impregnation tank, each of said fixing tanks containing a body of an aqueous liquid therein; means for flowing the aqueous liquid continuously through said fixing tanks; a longitudinally elongated outlet tank having a first portion disposed substantially parallel and adjacent to the last of the series of fixing tanks and a discharge portion communicating with the atmosphere, said outlet tank having a body of water therein and a wall section separating said first and discharge portions extending into the upper portion of the body of water to provide a liquid seal between said first portion and the atmosphere; means for lowering successive groups of hides into said inlet tank and moving said groups of hides while immersed in the body of water in said inlet tank along the length of said tank; means for elevating and removing said groups of hides from the discharge portion of said inlet tank, for displacing said groups of hides laterally over the first of said dehydration tanks and for lowering said groups of hides into the body of extracting solvent in the first of said dehydration tanks; means for moving said groups of hides through the dehydration tanks while immersed in the body of liquid therein, for elevating said groups of hides when they reach the discharge end of the dehydration tanks to remove them therefrom, for moving said groups of hides into and out of said impregnation tank and said fixing tanks, for displacing said groups of hides laterally from the impregnation tank over the first of said fixing tanks and from each preceding fixing tank over the next succeeding fixing tank and from the last fixing tank over and into said outlet tank, and for lowering said groups of hides into the respective tanks over which said groups of hides are moved; means for elevating and removing said groups of hides from the discharge portion of said outlet tank to return said groups of hides to the atmosphere; the means for moving the successive groups of hides through said dehydration tanks moving them in a direction countercurrent to the direction of flow of the extracting solvent through said dehydration tanks; and a hood enclosing the upper portion of said dehydration, impregnation and fixing tanks, the discharge portion of said inlet tank and the first portion of said outlet tank.

2. The apparatus as defined in claim 1, including a longitudinally elongated desolventizing tank disposed substantially parallel to and between the last of said dehydration tanks and said impregnation tank; means for circulating a heated stream of gas through said desolventizing tank to evaporate water and said volatile organic extracting solvent from the successive groups of hides passed therethrough; and a longiutdinally elongated rinse tank disposed substantially parallel to and between said impregnation tank and the first of said fixing tanks, said rinse tank containing a body of an organic solvent for said impregnant therein.

3. Apparatus for the treatment of animal hides and skins comprising, in combination, a longitudinally elongated inlet tank containing a body of water therein of a depth such that successive groups of hides, with the hides in each group in side by side relation, can be completely immersed in said body and moved therethrough, said tank comprising an inlet portion communicating with the atmosphere, through which inlet portion the successive groups of hides are introduced into said body of water, a discharge portion and a baffle separating said inlet and discharge portions extending into the upper portion of the body of water to provide a liquid seal between the atmosphere and said discharge portion; a series of longitudinally elongated dehydration tanks arranged in side by side relation and disposed substantially parallel to the discharge portion of the inlet tank, each of said dehydration tanks containing a body of a volatile organic extracting solvent; means for flowing said extracting solvent continuously through said dehydration tanks in sequence from the last to the first of the tanks of the series; a longitudinally elongated desolventizing tank disposed substantially parallel and adjacent to the last dehydration tank of the series; means for circulating a heated stream of gas through said desolventizing tank; a longitudinally elongated impregnation tank disposed substantially parallel and adjacent to said desolventizing tank, said impregnation tank containing a body of a volatile organic impregnating solvent having therein an impregnant for the hides; a longitudinally elongated rinse tank disposed substantially parallel and adjacent to said impregnation tank, said rinse tank containing a body of said impregnating solvent therein; a series of longitudinally elongated fixing tanks arranged in side by side relation and disposed substantially parallel and adjacent to said rinse tank, each of said fixing tanks containing a body of an aqueous liquid therein; means for flowing the aqueous liquid continuously through said fixing tanks in sequence from the last to the first of the tanks of the series; a longitudinally elongated outlet tank having a first portion disposed substantially parallel and adjacent to the last fixing tank of the series and a discharge portion communicating with the atmosphere, said outlet tank having a body of water therein and a wall section separating said first and discharge portions extending into the upper portion of the body of water to provide a liquid seal between said first portion and the atmosphere; means for lowering successive groups of hides into the inlet portion of said inlet tank; pusher means associated with said inlet tank for moving said groups of hides while immersed in the body of water therein along the length of said tank; a first elevator associated with the discharge portion of said inlet tank for lifting and removing said groups of hides from said discharge portion; hoist means movably mounted above the discharge portion of said inlet tank for displacing said groups of hides laterally over the first of said dehydration tanks and for lowering said groups of hides into the body of extracting solvent in the first of said dehydration tanks; puller means associated with said first dehydration tank and with at least one succeeding tank for moving said groups of hides while contained within said tanks along the length thereof; hoist means movably mounted above the discharge end of said first dehydration tank and each of said succeeding tanks for elevating said groups of hides from each such tank, for displacing said groups of hides laterally over each succeeding tank and for lowering said groups of hides into each of said succeeding tanks prior to said outlet tank; the hoist means movably mounted above the last of said fixing tanks elevating said groups of hides above the tank, displacing said groups of hides laterally over the first portion of said outlet tank and lowering said groups of hides to an intermediate position above said first portion; a second elevator positioned above the first portion of said tank outlet for lowering said groups of hides into the body of water in said outlet tank from said intermediate position; means for elevating and removing said groups of hides from the discharge portion of said outlet tank to return said groups to the atmosphere; and a hood enclosing the upper portion of said dehydration, desolventizing, impregnation, rinse and fixing tanks, said discharge portion of the inlet tank and said first portion of the discharge tank.

4. The apparatus as defined in claim 1, including a plurality of rack and frame assemblies on which each of the successive groups of hides are mounted, track means disposed along the length of each of said tanks for supporting said rack and frame assemblies when said groups of hides are immersed in the bodies of liquid contained in said tanks, means for moving said rack and frame assemblies on said track means along the length of each of the dehydration tanks, and lifting means for elevating said rack and frame assemblies above the track means associated with said tanks to remove said groups of hides from said tanks, for displacing said rack and frame assemblies laterally over the next succeeding tank and for then lowering said rack and frame assemblies to the track means disposed above the suceeding tank to immerse said groups of hides in the body of liquid contained in said succeeding tank.

5. The apparatus as defined in claim 4, in which said lifting means includes hoist means for elevating a plurality of said rack and frame assemblies in side by side relation at the same time above a plurality of said tanks arranged in side by side relation, for displacing each of the assemblies of said plurality a distance equal to the distance between adjacent tanks and for lowering said rack and frame assemblies into the plurality of tanks therebeneath in the displaced position, except the outlet tank, said hoist means effecting the transfer of each of said assemblies, in sequence, from said inlet tank, to each of said dehydration tanks, said impregnation tank, each of said fixing tanks and said outlet tank.

6. The apparatus as defined in claim 4, in which said lifting means includes a pair of hoists for transferring each of said assemblies to the last of said dehydration tanks and thence to said impregnation tank, each of said fixing tanks and said outlet tank, elevating means for independently raising and lowering each of said pair of hoists to and from a raised position, coupling means for engaging said pair of hoists when positioned in said raised position and displacement means for moving said pair of hoists horizontally at the same time when in said raised position and engaged by said coupling means.

References Cited in the file of this patent

UNITED STATES PATENTS

| | | |
|---|---|---|
| 1,115,182 | Enslin | Oct. 27, 1914 |
| 1,699,712 | Pratt | Jan. 22, 1929 |
| 2,486,623 | Wilks | Nov. 1, 1949 |
| 2,599,503 | Wilson | June 3, 1952 |